(No Model.)

A. F. DICKEY, O. P. SHAVER, H. STAHL & E. C. WELCH.
WIRE FENCE.

No. 456,022. Patented July 14, 1891.

Witnesses
E. P. Ells,
J. M. Nesbit.

Inventors
A. F. Dickey,
O. P. Shaver,
H. Stahl,
E. C. Welch.
per Lehmann & Pattison Attorneys.

UNITED STATES PATENT OFFICE.

AARON F. DICKEY, OLIVER P. SHAVER, HERMAN STAHL, AND EVERETT C. WELCH, OF FRIEDENS, PENNSYLVANIA.

WIRE FENCE.

SPECIFICATION forming part of Letters Patent No. 456,022, dated July 14, 1891.

Application filed February 3, 1891. Serial No. 380,048. (No model.)

*To all whom it may concern:*

Be it known that we, AARON F. DICKEY, OLIVER P. SHAVER, HERMAN STAHL, and EVERETT C. WELCH, of Friedens, in the county of Somerset and State of Pennsylvania, have invented certain new and useful Improvements in Wire Fences; and we do hereby declare the following to be a full, clear, and exact description of the invention, such as will enable others skilled in the art to which it pertains to make and use the same, reference being had to the accompanying drawings, which form part of this specification.

Our invention relates to an improvement in wire fences; and it consists in the construction which will be fully described hereinafter, and pointed out in the claims.

The object of our invention is to attach metallic pickets to the wires of a fence, so as to call the attention of the stock to the wires, and thus prevent them from running against the barbs or the wires and being injured.

Figure 1:
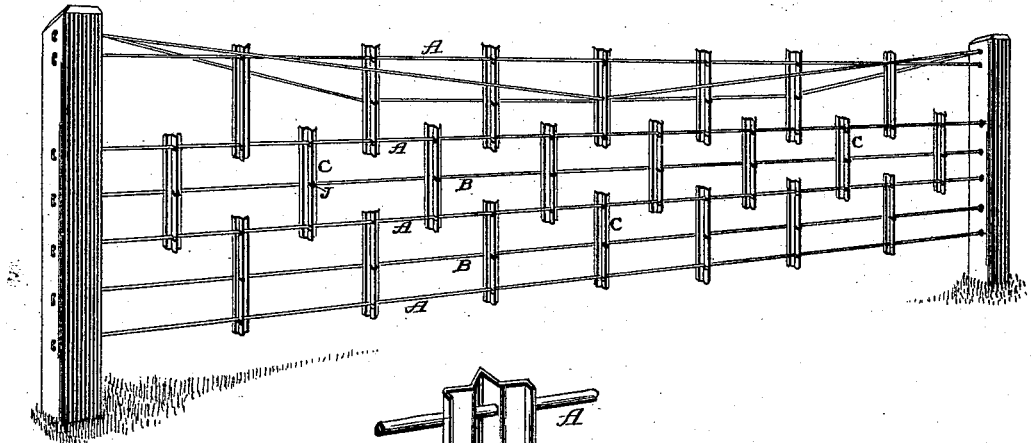
Figure 2:
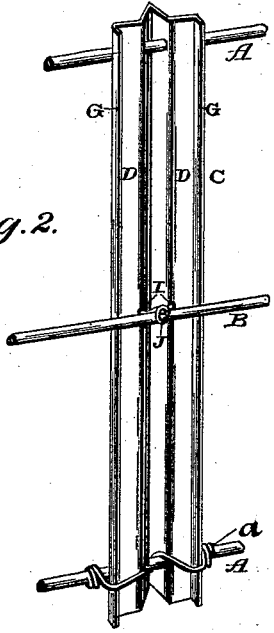

In the accompanying drawings, Figure 1 represents a perspective of a portion of a panel of a fence to which our invention is applied. Fig. 2 is a detail.

A represents the main wires of a wire fence, and B the intermediate wires which extend between the main wires. The pickets C, which are stamped or otherwise formed from sheet metal, are made of any desired length, and are fastened to these wires at each end in the manner shown. Each picket C is made V-shaped at its center, and the portions D, of any suitable width upon opposite sides of the V, are turned outward, and then the edges G are turned at right angles to the portions D, as shown. It is not necessary to turn the edges G at a right angle to the portions D, though by so doing the pickets are made stronger and better adapted for resisting lateral pressure. If the pickets are made V-shaped alone, any pressure brought to bear against them has a tendency to close or mash them out of shape; but where the portions D G are formed upon the edges of the V the pickets are braced and made strong enough to prevent their being injured readily at the same time that they present a greater surface, and thus more readily attract the attention of animals to the wires than they would do if the pickets were made V-shaped alone. Where the main wires are attached to the pickets, slots are formed through the V-shaped portions of the pickets, and in these slots the main wires A catch. These wires may be fastened either by means of nails or wedges driven in between the pickets and the wires from the inner sides of the V-shaped portions, or the wires may be fastened to the pickets by wrapping a separate wire *a* around the main wire from opposite sides of the picket.

In fastening the intermediate wires to the pickets two holes I are punched through each picket near its center and at the junction of the V-shaped and outwardly-turned portions D, and through these two holes is passed a short wire J, which is wrapped tightly around the intermediate wire, as shown. These pickets, made of light sheet metal, serve not only to attract the attention of the animals to the wires, so as to prevent them from running into them, but they brace and strengthen the wires and hold them at equal distances apart, and thus enable the fence-posts to be set at greater distances from each other. These pickets also enable the truss to be run at the angle shown, and thus brace the upper horizontal wire.

Having thus described our invention, we claim—

1. A metallic picket consisting of a central V-bend having the outwardly-bent portions D, the flanges G, bent at right angles to the portions D and in the opposite direction from the V-bend, and openings in the V-bend which extend only to the portions D, whereby the wires rest upon the outer face of the said portions D, and a holding device, substantially as shown.

2. A metallic picket consisting of a central V-bend having the outwardly-bent portions D and the flanges G, bent at right angles to the portions D and in the opposite direction from the V-bend, the said V-bend having openings for the wires, in combination with a securing device comprising a wire having its ends twisted around the fence-wire outside of the flanges G, passing around and engaging the outer edges of the said flanges, and its central portion twisted around the fence-wire in the V-bend, substantially as shown.

In testimony whereof we affix our signatures in presence of two witnesses.

AARON F. DICKEY.
OLIVER P. SHAVER.
HERMAN STAHL.
EVERETT C. WELCH.

Witnesses:
RUFUS E. MEYERS,
JOHN L. SAYLOR.